United States Patent
Chimento et al.

(10) Patent No.: US 8,188,726 B2
(45) Date of Patent: May 29, 2012

(54) METHOD AND ARRANGEMENT TO DETERMINE THE CELL CAPACITOR VOLTAGE OF A CELL OF A MULTI-CELL POWER CONVERTER

(75) Inventors: Filippo Chimento, Västerås (SE); Frans Dijkhuizen, Skultuna (SE); Jean-Philippe Hasler, Vasteras (SE); Falah Hosini, Vasteras (SE); Tomas Jonsson, Vasteras (SE); Peter Lundberg, Vasteras (SE); Mauro Monge, Vasteras (SE); Staffan Norrga, Stockholm (SE); Jan R. Svensson, Vasteras (SE); Fredrik Tinglow, Arboga (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/290,682

(22) Filed: Nov. 7, 2011

(65) Prior Publication Data

US 2012/0049837 A1    Mar. 1, 2012

Related U.S. Application Data

(63) Continuation of application No. PCT/EP2009/055524, filed on May 7, 2009.

(51) Int. Cl.
*G01R 19/00* (2006.01)
(52) U.S. Cl. ........... 324/76.11; 363/65; 363/68; 363/71; 363/98; 363/132; 307/105
(58) Field of Classification Search ................. 324/76.11
See application file for complete search history.

(56) References Cited

U.S. PATENT DOCUMENTS

| | | | | |
|---|---|---|---|---|
| 5,291,388 | A | * | 3/1994 | Heinrich .......................... 363/98 |
| 6,400,590 | B2 | * | 6/2002 | Hickman ......................... 363/65 |
| 7,230,837 | B1 | * | 6/2007 | Huang et al. ..................... 363/71 |
| 2002/0027791 | A1 | * | 3/2002 | Yoshioka et al. ................ 363/71 |
| 2009/0102288 | A1 | * | 4/2009 | Blackmond ...................... 307/71 |
| 2010/0213921 | A1 | * | 8/2010 | Abolhassani et al. ......... 323/328 |
| 2012/0001618 | A1 | * | 1/2012 | Herke et al. ............... 324/76.11 |

FOREIGN PATENT DOCUMENTS

EP    0868014 B1    9/1998

OTHER PUBLICATIONS

Peng et al, "A multilevel voltage-source inverter with separate DC sources for Static Var generation", IEEE Transactions on Industry Applications, vol. 32, No. 5, Sep./Oct. 1996, pp. 1130-1138.
International Search Report and Written Opinion of the International Searching Authority; PCT/EP2009/055524; Issued: Jan. 25, 2010; Mailing Date: Feb. 1, 2010; 13 pages.

* cited by examiner

*Primary Examiner* — Timothy J Dole
*Assistant Examiner* — Benjamin M Baldridge
(74) *Attorney, Agent, or Firm* — St. Onge Steward Johnston & Reens LLC

(57) ABSTRACT

An arrangement to determine a cell capacitor voltage value of a cell of a multi-cell power converter includes the cell and a control unit. The cell itself includes four power electronic valves interconnected as a full-bridge converter having a first and a second phase leg, where each phase leg includes a series-connection of two of the four power electronic valves and where the connection point between the two power electronic valves of each phase leg is externally connectable, a cell capacitor being connected in parallel to the first and the second phase legs, and four gate units, each being connected to a corresponding one of the power electronic valves as well as to the control unit.

16 Claims, 3 Drawing Sheets

METHOD AND ARRANGEMENT TO DETERMINE THE CELL CAPACITOR VOLTAGE OF A CELL OF A MULTI-CELL POWER CONVERTER

CROSS-REFERENCE TO RELATED APPLICATIONS

The present application is a continuation of pending International patent application PCT/EP2009/055524 filed on May 7, 2009 which designates the United States and the content of which is incorporated herein by reference.

FIELD OF THE INVENTION

The invention relates to a method and an arrangement to determine the cell voltage of a cell of a multi-cell power converter, where the arrangement comprises the cell and a control unit and where the cell comprises four power electronic valves interconnected as a full-bridge converter having a first and a second phase leg, with each phase leg comprising a series-connection of two of the four power electronic valves and the connection point between the two power electronic valves of each phase leg being externally connectable, a cell capacitor being connected in parallel to the first and the second phase legs, and four gate units, each being connected to a corresponding one of the power electronic valves as well as to the control unit.

BACKGROUND OF THE INVENTION

A multi-cell power converter is here to be understood as a power converter comprising a series connection of at least two identical subunits, called cells, where each subunit or cell comprises at least four power electronic valves and an energy storage unit, such as a capacitor. The series connection of the at least two cells can be connected either between two AC phases or between an AC phase and a neutral or between a first and a second DC pole, depending on the nature of the power converter, i.e. depending on whether it is an AC/AC or AC/DC converter, on how many phases it possesses and on how the phases are connected to each other.

Each of the cells of the multi-cell power converter, which the invention is related to, comprises four power electronic valves interconnected as a full-bridge converter or sub-converter with a cell capacitor connected in parallel to two identical phase legs, each phase leg comprising a series-connection of two of the power electronic valves. Such a cell structure used for an AC/AC converter is for example known from F. Z. Peng et al, "A multilevel voltage-source inverter with separate DC sources for Static Var generation", IEEE Transactions on Industry Applications, Vol. 32, No. 5, September/October 1996, pp. 1130-1138. The connection point between the two power electronic valves of each of the two phase legs is connected to an output terminal, i.e. the cell is via these two output terminals connectable to either another, neighbouring cell or to any other external device or connection.

The power electronic valves of the converter the invention is related to each comprise a power semiconductor switch of turn-off type, such as an IGBT (Insulated Gate Bipolar Transistor), an IGCT (Integrated Gate Commutated Thyristor) or a GTO (Gate Turn-off Thyristor), and a free wheeling diode in anti-parallel connection thereto. The power semiconductor switch and the free wheeling diode may be singular devices or a series-connection of multiple such devices, depending on the voltage levels they are intended to be used for. The same is true for the cell capacitor.

In order to generate the electronic signals required to turn each of the power semiconductor switches on and off, a so called gate driver unit or gate unit is connected to the gate of each power semiconductor switch. The structure and function of an example for such a gate unit is known from EP0868014B1, where the gate unit receives via a fibre optic communication line a control signal from a control apparatus. The control signal is either a logical one to turn the corresponding power semiconductor switch on or a logical zero to turn it off.

The four power semiconductor switches in the power electronic valves of each cell of the multi-cell power converter as described above are according to the art controlled in such a way that one of three different possible voltage levels is generated across the output terminals of the corresponding cell, where the voltage levels are either plus or minus the voltage across the cell capacitor or a zero voltage. The voltage across the cell capacitor is in the following called the cell capacitor voltage and a numerical representation of the cell capacitor voltage is called cell capacitor voltage value. By appropriately timing the switching of the power semiconductor switches, it is in addition ensured that the cell capacitors are recharged at least from time to time in order to compensate for any losses in the respective cell. Furthermore, the cell capacitors are recharged or charged to keep the cell capacitor voltage on a desired capacitor voltage level which is preferably equal for all series-connected cells in order to keep the voltage division over the cells balanced. The overall voltage of the multi-cell power converter is then controlled by adjusting the sum of the output voltages of all series-connected cells in a desired manner.

For this control of the cells and the converter, respectively, the individual cell capacitor voltage values need to be known. A straightforward solution to obtain a cell capacitor voltage value is to arrange a first voltage measurement unit in parallel connection to the cell capacitor.

SUMMARY OF THE INVENTION

It is an object of the present invention to suggest an improved method and arrangement to determine the cell capacitor voltage value of a cell of the multi-cell power converter described above.

This object is achieved by a method to determine a cell capacitor voltage value of a cell of a multi-cell power converter and an arrangement to determine a cell capacitor voltage value of a cell of a multi-cell power converter, where the arrangement comprises the cell and a control unit.

The invention is based on the recognition of the fact that, during normal operation of the cells of the multi-cell converter, the switching pattern of the four power semiconductor switches per cell is such that, apart from commutation and other transient times, only one power semiconductor switch per phase leg is turned on while the other is turned off, where turned on means that the switch is in the closed state and turned off means that the switch is in the open state. It was further recognized that, depending on the resistance of the power semiconductor switch in turn-on state, either the whole or at least the biggest part of the cell capacitor voltage is applied to the power semiconductor switch which is turned off. It would therefore be possible to determine the cell capacitor voltage value by measuring the voltage across one of the two power semiconductor switches per cell which are currently turned off and by, if need be, correcting this value by the voltage drop across the respective power semiconductor switch in turn-on state.

This basic insight was further developed, so that the method according to the invention is to take a continuous voltage measurement across each of the power electronic valves and to determine the cell capacitor voltage value based on at least one of the continuous voltage measurements. The voltage across the power electronic valves equals the voltage across the corresponding power semiconductor switches, since the only further component in the valve is the free wheeling diode in anti-parallel connection to the switch.

In the arrangement according to the invention, the method steps of the invention are performed by different units in an interactive way. The first step to take the continuous voltage measurement of each of the four power electronic valves is performed by four corresponding voltage measurement units, where each of them is integrated in one of the four gate units. Each of the voltage measurement units is further adapted to transmit its continuous voltage measurement to the control unit. The control unit itself is the part of the arrangement which performs the second step of the method, i.e. the control unit is adapted to receive the continuous voltage measurement from each gate unit and to determine the cell capacitor voltage value based on at least one of the continuous voltage measurements.

By integrating the voltage measurement unit into each of the gate units, the overall design of the multi-cell power converter remains unchanged since the electrical and communication connections already present in each of the cells are made use of. This results in a reduced effort and reduced costs for the construction, installation, in particular cabling, and maintenance of the converter. In other words, no further communication lines between the voltage measurement units and the control unit need to be introduced, opposed to the case of a voltage measurement unit which would be directly connected to the cell capacitor. Instead, the continuous voltage measurements are transmitted via the existing communication lines between the gate units and the control unit.

A further advantage is the increased modularity of the components in the cell. Identical modules can be formed, each comprising a power electronic valve together with its corresponding gate unit and voltage measurement unit. These modules can be premanufactured, which simplifies their handling and makes the installation and replacement of cells more cost effective.

According to the invention, the continuous voltage measurements are not only taken across one power electronic valve of one phase leg but across all power electronic valves, i.e. the two power electronic valves of both phase legs. This results in a redundant measurement of voltages which correspond to the cell capacitor voltage, since in general in both phase legs always one of the two power semiconductor switches is in turn-off state. Accordingly, it is at almost every point in time possible to take from both phase legs a continuous voltage measurement which both represent or closely represent the cell capacitor voltage. An analysis of those two redundant continuous voltage measurements allows an increased reliability and availability of the determined cell capacitor voltage value which in turn improves the operational availability and safety of the multi-cell power converter. In addition, further information about the status of the respective cell can be generated from the two redundant continuous voltage measurements, where such further information is valuable to the operator of the converter. This will become more apparent from the further description of possible embodiments of the invention below.

According to a preferred embodiment of the invention, the continuous voltage measurements are taken only while none of the power electronic valves belonging to the same phase leg is in a switching process. This improves the usability of the continuous voltage measurements since the voltage across the power electronic valves is only taken while no transient processes occur, so that when calculating the cell capacitor voltage value the correspondence between the cell capacitor voltage and the voltage across the power electronic valves with their corresponding power semiconductor switch in turn-off state can be assumed directly without taking any switching effects into account.

In a specific embodiment of the invention, a first continuous voltage measurement of one of the gate units of the first phase leg and a second continuous voltage measurement of one of the gate units of the second phase leg are taken simultaneously and while the corresponding power electronic valves are in their open state, and the cell capacitor voltage value is determined by choosing one of the first or second continuous voltage measurements or by calculating an overall average value of the first and the second continuous voltage measurements. In this embodiment, only the voltages across the valves with the power semiconductor switch in turn-off state are taken into account by the control unit when determining the cell capacitor voltage value since the voltage across the power semiconductor switch in turn-on state is assumed to be zero. The redundancy of the two continuous voltage measurements is then utilized in different ways. One possibility is to calculate the overall average value of the first and the second continuous voltage measurements, thereby reducing the influence of noise and other disturbances on the result for the cell capacitor voltage value. Another possibility is to take only one of the first and second continuous voltage measurements directly as the result for the cell capacitor voltage and to use the other of the two measurements to check the plausibility of the one continuous voltage measurement.

In a first development of the specific embodiment, a third continuous voltage measurement of the other one of the gate units of the first phase leg and a fourth continuous voltage measurement of the other one of the gate units of the second phase leg are taken while the corresponding power electronic valves are in their closed state. This is done in addition to taking the first and second continuous voltage measurements and at the same point in time. The cell capacitor voltage value is then determined by choosing one of the sums of either the first and the third or the second and the fourth continuous voltage measurements or by calculating an overall average value of the sums of the first and the third and of the second and the fourth continuous voltage measurements. This embodiment is applied where the voltage across the power semiconductor switches in turn-on state differs from zero, so that the cell capacitor voltage is divided between the two power semiconductor switches of each phase leg. In this embodiment, redundant values are achieved by calculating the sum of the continuous voltage measurements per phase leg. The redundancy of the sums is then utilized in a way analogous to the description above.

In a second development of the specific embodiment, a first average value of at least two consecutively taken first continuous voltage measurements and a second average value of at least two consecutively taken second continuous voltage measurements are determined, and the cell capacitor voltage value is determined by choosing one of the first or second average values or by calculating an overall average value of the first and the second average values. In this embodiment, it is again assumed that the voltage across the power semiconductor switches in turn-off state is sufficient to represent the cell capacitor voltage. Here, not only the instantaneously taken first and second continuous voltage measurements but also their corresponding measurements of previous instances in time are taken into account. By calculating a corresponding first and second average value of consecutively taken first and second continuous voltage measurements, the noise level of the resulting cell capacitor voltage value is reduced. Also in this embodiment, redundancy is utilized analogous to the way described above.

In an even further development of the specific embodiment, a third average value of at least two consecutively taken third continuous voltage measurements and a fourth average value of at least two consecutively taken fourth continuous voltage measurements are determined, and the cell capacitor voltage value is determined by choosing one of the sums of either the first and the third or the second and the fourth average values or by calculating an overall average value of the sums of the first and the third and of the second and the fourth average values. This is in fact a combination of the first and second developments of the specific embodiment.

As described above, the redundancy of the continuous voltage measurements taken from both phase legs can be utilized to improve the reliability and availability of the cell capacitor voltage value. In particular, a comparison of the results from the two phase legs can be analyzed in order to detect a malfunctioning of one of the four power electronic valves, such as an undesired short- or open-circuiting of or an overvoltage across the power electronic valve. Such malfunctioning can also be recognized from an analysis of the time dependent behaviour of consecutively taken measurements across that particular power electronic valve, which analysis can be performed stand-alone or as a complement to the consideration of the redundant measurements.

Further to recognizing a malfunctioning of just one power electronic valve, a malfunctioning of the whole cell can be recognized, such as a commutation failure or a failure of a voltage measurement unit of one of the four gate units.

In a further embodiment of the invention, the continuous voltage measurements are complemented by a discrete level voltage measurement which is taken for each of the power electronic valves. The discrete level voltage measurement determines a voltage range in which the voltage across the corresponding power electronic valve lies. The continuous voltage measurement for each power electronic valve is then compared with its corresponding voltage range in order to detect a possible malfunctioning of the voltage measurement units. The voltage range can thereby be a closed range defined by a lower and upper voltage limit or a range which is open to one side being defined by just a lower or an upper voltage limit. The discrete level voltage measurement is usually already present in each gate unit and is mainly used for controlling the gate of the corresponding power semiconductor switch during switching. A combination of the fast and less accurate discrete level voltage measurement with the slower and much more accurate continuous voltage measurement results in an even higher reliability of the determined cell capacitor voltage value.

In case it is detected that at least one of the continuous voltage measurements lies outside its corresponding voltage range, the at least one of the continuous voltage measurements is disregarded when determining the cell capacitor voltage. As a discrepancy between the discrete level voltage measurement and the corresponding continuous voltage measurement indicates that the continuous voltage measurement can not be trusted, only the continuous voltage measurement or measurements of the opposite phase leg is used to determined the cell capacitor voltage value. Here, the advantage of the redundancy becomes clearly visible, as the operation of the cell can be continued even though one of its voltage measurement units seems to be defective, In case it is detected that the continuous voltage measurements of both gate units of one phase leg lie outside their corresponding voltage ranges, the cell is declared to be a faulty cell. As a result, this cell could for example be put into a so called zero voltage mode of operation, i.e. its output AC voltage could be set constantly to zero, and the cell could then be replaced by another redundant cell, so that the operation of the multi-cell power converter can be continued without any interruption.

In a specific embodiment of the arrangement, each of the four gate units is adapted to generate and transmit its continuous voltage measurement on a request received from the control unit. Accordingly, the control unit pulls the required information from the gate units so that the gate units themselves can all be implemented identical to each other and with a low level of intelligence.

In a further embodiment of the arrangement, the control unit is adapted to receive the continuous voltage measurements from the gate units at regular time intervals.

In an even further embodiment of the arrangement, the gate units are connected to the control unit via an electrically isolated communication link, in particular an optical link.

BRIEF DESCRIPTION OF THE DRAWINGS

The features and advantages of the present invention will become more apparent to a person skilled in the art from the following description of the appended drawings, in which.

DETAILED DESCRIPTION OF THE INVENTION

Figure 1:
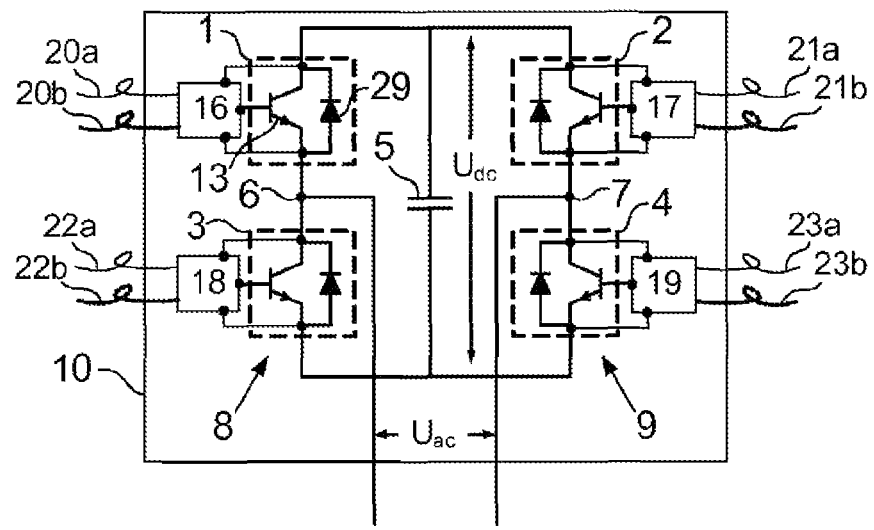
FIG. 1 shows a cell of a multi-cell power converter known in the art.

FIG. 1 shows a cell 10 which may be part of a multi-cell power converter as known from the art. The cell 10 comprises four power electronic valves 1, 2, 3, and 4, where each power electronic valve comprises a power semiconductor switch 13 of turn-off type and a free wheeling diode 29 in anti-parallel connection thereto. In FIG. 1, there are further gate units 16, 17, 18 and 19 illustrated which are connected to the gate of the power semiconductor switch 13 of each corresponding power electronic valve 1, 2, 3 and 4, respectively. Each gate unit 16 to 19 is connected via an output communication line 20a to 23a, respectively, and an input communication line 20b to 23b, respectively, to a central control unit 28, where communication signals are transferred from the respective gate unit to the control unit 28 via the output communication line and from the central control unit 28 to the respective gate unit via the input communication line. The communication signals sent from the central control unit 28 to the gate units 16 to 19 are mostly control signals to turn the corresponding power semiconductor switch 13 on or off. These control signals can be for example a logical one and zero, respectively, or in a more advanced embodiment binary signals, especially coded signals.

The four power electronic valves 1, 2, 3 and 4 are interconnected as a full-bridge converter which has a first phase leg 8 and a second phase leg 9 and a cell capacitor 5 in parallel connection to the two phase legs. The first phase leg 8 is formed by a series connection of the power electronic valves 1 and 3 and the second phase leg 9 is formed by a series connection of the power electronic valves 2 and 4. The connection points 6 and 7 between the two power electronic valves of each phase leg, i.e. between power electronic valves 1, 3 and 2, 4, respectively, is externally connectable. When the cell 10 is arranged in a multi-cell power converter the two connection points 6 and 7 form an AC voltage terminal, as is indicated by the voltage sign $U_{ac}$. The voltage across the cell capacitor 5, i.e. the cell capacitor voltage, is denoted with $U_{dc}$.

Figure 2:
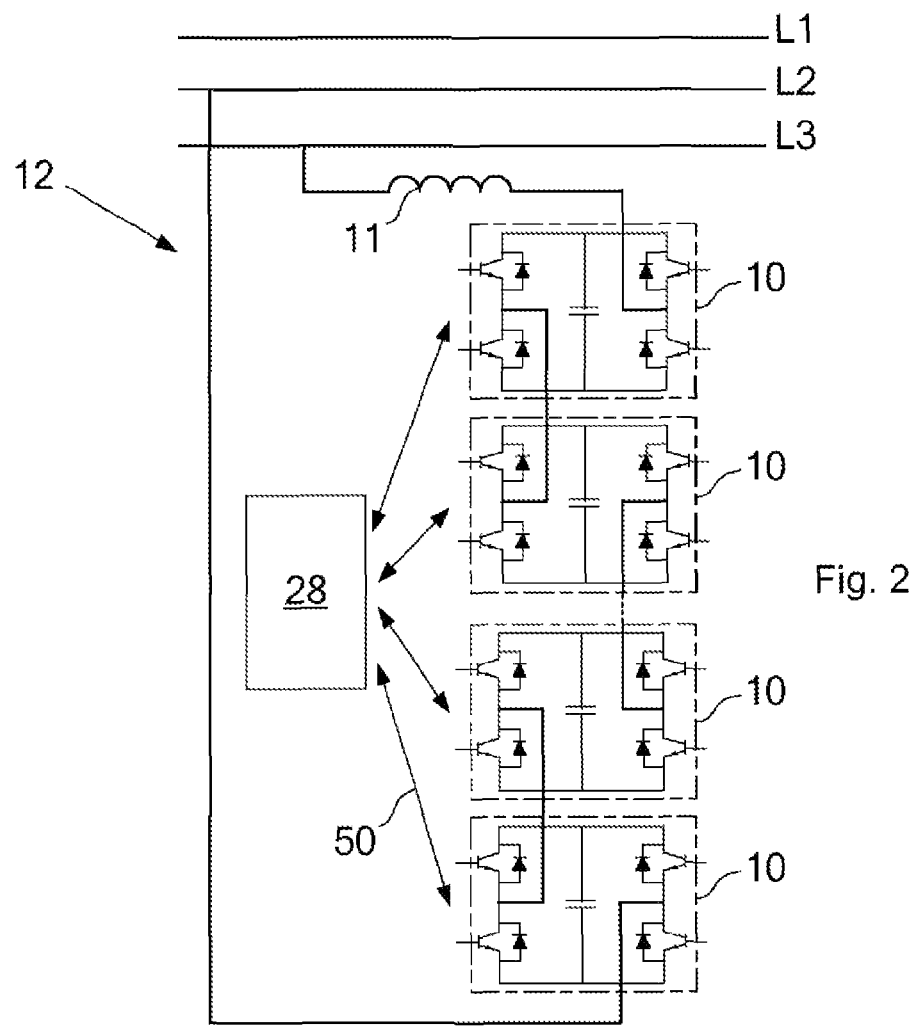
FIG. 2 shows a multi-cell power converter known from the art, comprising a series connection of cells according to FIG. 1.

In FIG. 2, an example for a multi-cell power converter 12 is shown, which is known from the art. In the example, the multi-cell power converter 12 comprises the central control unit 28 and three identical phases which can be connected in a Delta- or Wye-arrangement to three AC power lines L1, L2 and L3. In FIG. 2, a Delta-connection is depicted, where only the one of the three phases which is connected between lines L2 and L3 is shown. Each phase of the multi-cell power converter 12 comprises a series connection of a phase reactor 11 and four cells 10. In alternative embodiments, any number of series connected cells 10 is possible. The cells 10 are illustrated in a simplified manner, where the gate units and the output and input communication lines are not shown here. The communication lines or links between each cell 10 and the central control 28 are indicated by double arrows 50. For the communication between the central control unit 28 and the cells, galvanically isolated communication means need to be used since, due to the series connection of the cells 10, each cell 10 in the multi-cell power converter 12 has a different voltage potential. In the example described here, optical fibre lines 20 to 23 (see FIGS. 1, 3 and 4) are used. As an alternative, wireless communication means could be applied.

As was described further above, the four power semiconductor switches 13 in the power electronic valves 1 to 4 of each cell 10 of the multi-cell power converter 12 are controlled by the control unit 28 in such a way that one of three different possible voltage levels is generated across the AC voltage terminal of the corresponding cell 10, where the three voltage levels are either plus or minus the cell capacitor voltage $U_{dc}$ or zero voltage. By appropriately timing the switching of the power semiconductor switches 13, where the switching signals are generated by the corresponding gate units 16 to 19, it is in addition ensured that the cell capacitors 5 are recharged at least from time to time in order to compensate for any losses in the respective cell. Furthermore, the cell capacitors 5 are recharged or charged to keep the cell capacitor voltage $U_{dc}$ on a desired capacitor voltage level which is preferably equal for all series-connected 10 in order to keep the voltage division over the cells balanced. The overall voltage of the multi-cell power converter 12 is then controlled by adjusting the sum of the output voltages $U_{ac}$ of all series-connected cells 10 in a desired manner. In addition, the voltage across each of the power electronic valves 1 to 4 may be used to provide supply power to the corresponding gate units 16 to 19, respectively, of each cell 10. The control of the cells 10 and thereby of the multi-cell power converter 12, can be performed either by the one central control unit 28 or by several control units.

Figure 3:
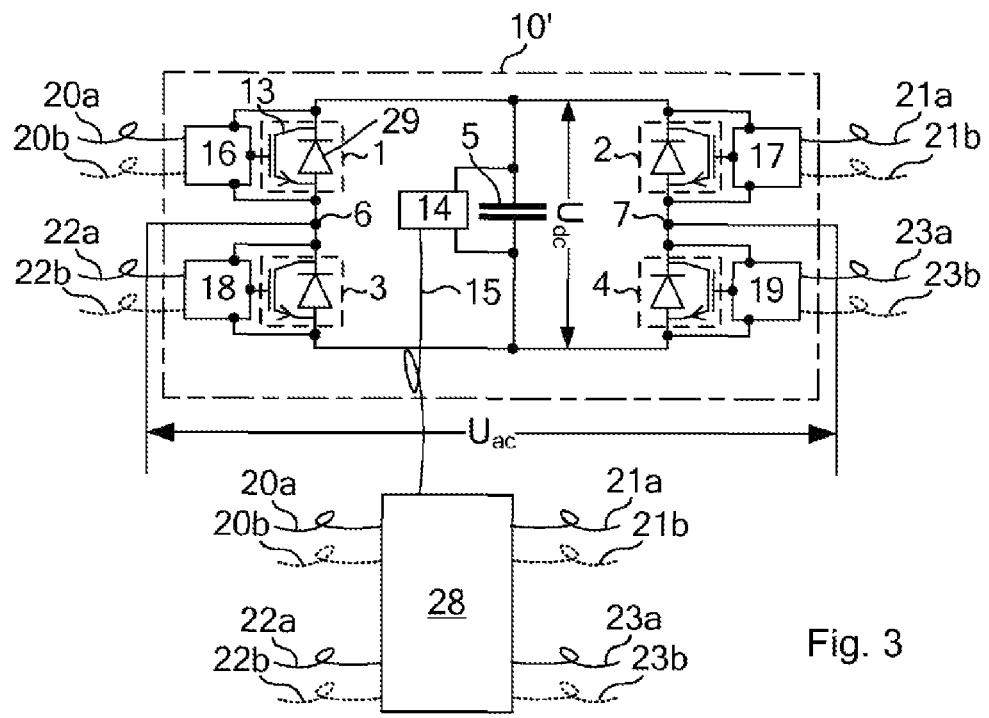
FIG. 3 shows an arrangement of a multi-cell power converter with means to determine a cell capacitor voltage value.

For the above described control of the cells 10 and thereby of the multi-cell power converter 12, the individual cell capacitor voltage values $U_{dc}$ need to be known, i.e. the corresponding cell capacitor voltage values need to be determined. A straightforward solution to obtain a cell capacitor voltage value is shown in FIG. 3, where a first voltage measurement unit 14 is connected in parallel to the cell capacitor 5. The first voltage measurement unit 14 measures the cell capacitor voltage $U_{dc}$ directly and transmits the resulting cell capacitor voltage value via an optical fibre line 15 to the control unit 28.

Figure 4:
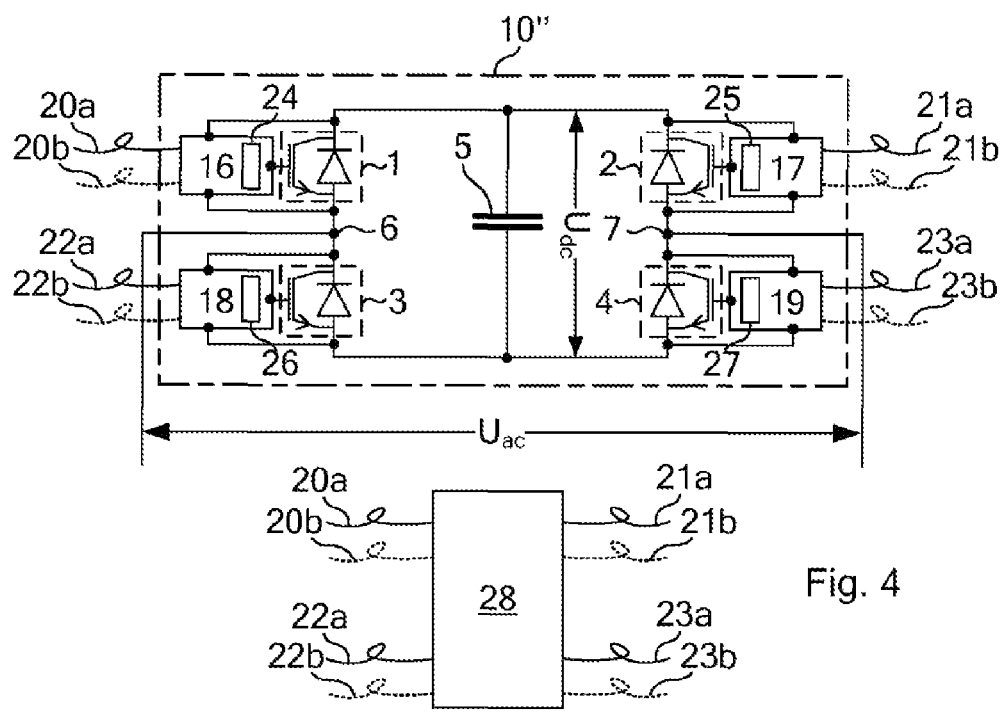
FIG. 4 shows an arrangement of a multi-cell power converter according to an embodiment of the invention with means to determine a cell capacitor voltage value.

This straightforward solution for obtaining a cell capacitor voltage value is improved by the present invention as shown in FIG. 4. Instead of arranging an additional voltage measurement unit in the cell, the overall design of the cell remains unchanged, see cells 10 and 10", by integrating voltage measurement units 24, 25, 26 and 27 into the gate units 16, 17, 18 and 19, respectively. As is clearly seen from FIGS. 1 and 4, the external electrical and communication connections already present in cell 10 are the same for cell 10" and no additional connections or lines were added. Accordingly, the overall design of multi-cell power converter 12 does not need to be changed and the installation effort and especially the cabling effort remain the same.

Figure 5:
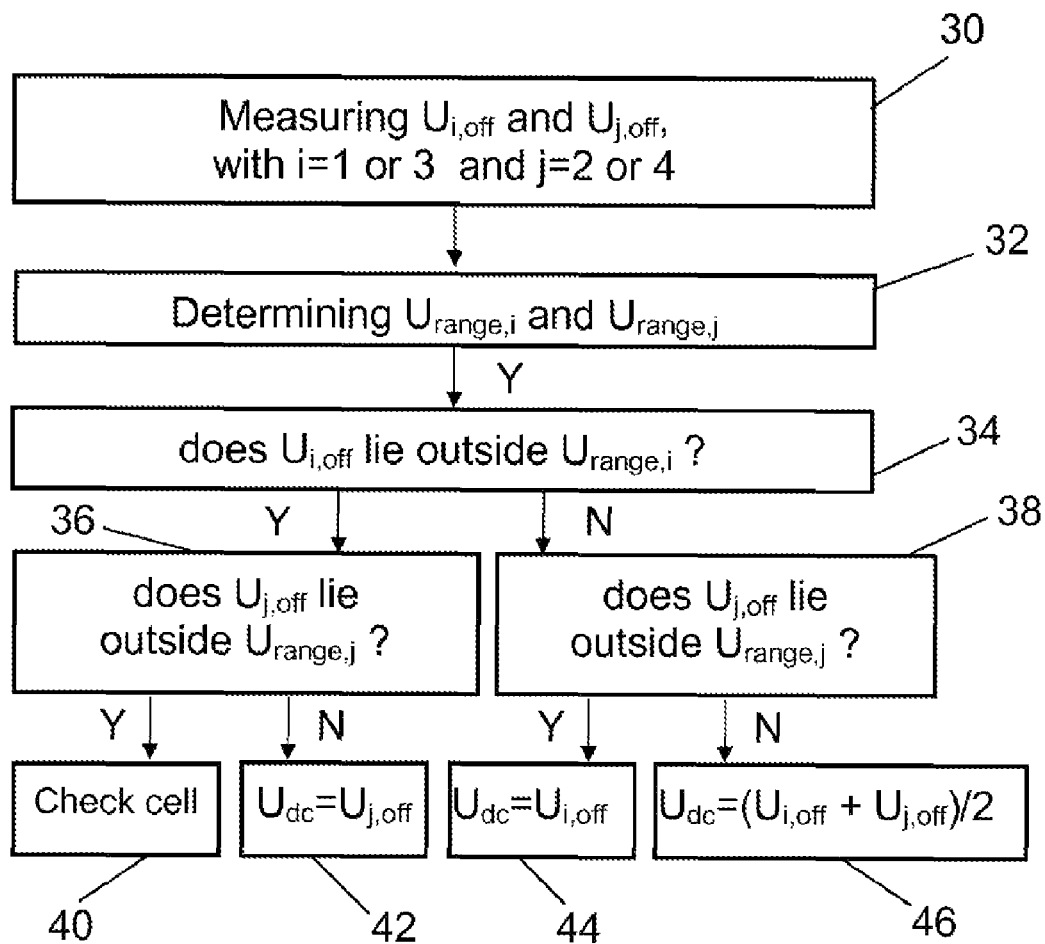
FIG. 5 shows a flowchart of a method according to an embodiment of the invention.

In FIG. 5, the flowchart of a method for determining the cell capacitor voltage value $U_{dc}$ of cell 10" according to an embodiment of the invention is shown. In a first step 30, a first continuous voltage measurement $U_{i,off}$ is taken by one of the gate units of the first phase leg 8, i.e. either by gate unit 16 or by gate unit 18, depending on which of the corresponding two power electronic valves 1 and 3, respectively, is momentarily in its open state, i.e. switched off. In addition, a second continuous voltage measurement $U_{j,off}$ is taken by one of the gate units 17 or 19 of the second phase leg 9, depending on which of the corresponding two power electronic valves 2 and 4, respectively, is momentarily switched off. The first and the second continuous voltage measurements $U_{i,off}$ and $U_{j,off}$ are both taken simultaneously, i.e. at the same point in time.

In a second step 32, a first discrete level voltage range $U_{range,i}$ is determined for the one of the power electronic valves 1 or 3 where the first continuous voltage measurement $U_{i,off}$ was taken for. Furthermore, a second discrete level voltage range $U_{range,j}$ is taken for the one of the power electronic valves 2 or 4 where the second continuous voltage measurement $U_{j,off}$ was taken for. The first and the second discrete level voltage ranges $U_{range,i}$ and $U_{range,j}$ both define a voltage range in which the voltage across the corresponding power electronic valve lies.

In a third step 34, the first continuous voltage measurement $U_{i,off}$ is compared with its corresponding first discrete level voltage range $U_{range,i}$. If it is detected that the first continuous voltage measurement $U_{i,off}$ lies outside its corresponding first discrete level voltage range $U_{range,i}$, it is assumed that the corresponding gate unit 16 or 18 of the first phase leg 8 is faulty, and the method continues with a fourth step 36. In the fourth step 36, the second continuous voltage measurement $U_{j,off}$ is compared with its corresponding second discrete level voltage range $U_{range,j}$. If it is detected that the second continuous voltage measurement $U_{j,off}$ lies outside its corresponding second discrete level voltage range $U_{range,j}$, the method continues with a fifth step 40. Since both phase legs 8 and 9 seem to comprise a faulty gate unit, the functionality of the cell 10" needs to be checked. This is done in the fifth step 40 by checking if the other two gate units, one in each phase leg, are functioning. If so, the cell can still be operated. If only in one of the phase legs both gate units are faulty, the whole cell needs to be declared to be faulty since no reliable cell capacitor voltage value can be determined anymore.

If in the fourth step 36 it is detected that the second continuous voltage measurement $U_{j,off}$ lies inside its corresponding second discrete level voltage range $U_{range,j}$, the method continues with a sixth step 42 and sets the cell capacitor voltage value $U_{dc}$ to be equal to the second continuous voltage measurement $U_{j,off}$. In this case, one of the gate units 16 and 18 of the first phase leg 8 is faulty while one of the gate units 17 and 19 of the second phase leg 9 was recognized to be working correctly. Accordingly, the cell capacitor voltage value $U_{dc}$ can be determined based on the measurement $U_{j,off}$ taken by this correctly working gate unit. Nevertheless, it is advisable to check in the sixth step 42 as well if the remaining gate unit of the first phase leg 8 is working correctly or if the whole cell 10" needs to be declared to be faulty.

If it is detected in the third step 34 that the first continuous voltage measurement $U_{i,off}$ lies inside its corresponding first discrete level voltage range $U_{range,i}$, it is checked in a seventh step 38 if the second continuous voltage measurement $U_{j,off}$ lies outside its corresponding second discrete level voltage range $U_{range,j}$. If so, the corresponding gate unit of the second phase leg 9 is faulty and accordingly, only the first continuous voltage measurement $U_{i,off}$ can be taken to determine the cell capacitor voltage value $U_{dc}$. This is done in an eighth step 44, where the cell capacitor voltage value $U_{dc}$ is set to be equal to the first continuous voltage measurement $U_{i,off}$. As was explained above for the case of a faulty gate unit in the first phase leg 8, it is now advisable to check the second phase leg 9 further in order to make sure that cell 10" can still be operated correctly.

If, on the other hand, it is detected in the seventh step 38 that the second continuous voltage measurement $U_{j,off}$ lies inside its corresponding second discrete level voltage range $U_{range,j}$, both continuous voltage measurements $U_{i,off}$ and $U_{j,off}$ can be used to determine the cell capacitor voltage value $U_{dc}$. In this example, the cell capacitor voltage value $U_{dc}$ is calculated in a ninth step 46 to be equal to the overall average value $(U_{i,off}+U_{j,off})/2$ of the first and the second continuous voltage measurements.

What is claimed is:

1. A method to determine a cell capacitor voltage value of a cell of a multi-cell power converter, where the cell comprises
   four power electronic valves interconnected as a full-bridge converter having a first and a second phase leg, where each phase leg comprises a series-connection of two of the four power electronic valves and where the connection point between the two power electronic valves of each phase leg is externally connectable,
   a cell capacitor being connected in parallel to the first and the second phase legs, and
   four gate units, each being connected to a corresponding one of the power electronic valves,
   characterized in that
   across each of the power electronic valves a continuous voltage measurement is taken by the corresponding gate unit, and
   the cell capacitor voltage value is determined based on at least one of the continuous voltage measurements.

2. The method according to claim 1, where the continuous voltage measurements are taken only while none of the power electronic valves belonging to the same phase leg is in a switching process.

3. The method according to claim 1, where a first continuous voltage measurement is taken by one of the gate units of the first phase leg and a second continuous voltage measurement is taken by one of the gate units of the second phase leg, where both are taken simultaneously and while the corresponding power electronic valves are in their open state, and the cell capacitor voltage value is determined by choosing one of the first or second continuous voltage measurements or by calculating an overall average value of the first and the second continuous voltage measurements.

4. The method according to claim 3, where in addition and at the same point in time
   a third continuous voltage measurement is taken by the other one of the gate units of the first phase leg and a fourth continuous voltage measurement is taken by the other one of the gate units of the second phase leg, both while the corresponding power electronic valves are in their closed state and
   the cell capacitor voltage value is determined by choosing one of the sums of either the first and the third or the second and the fourth continuous voltage measurements or by calculating an overall average value of the sums of the first and the third and of the second and the fourth continuous voltage measurements.

5. The method according to claim 3, where
   a first average value of at least two consecutively taken first continuous voltage measurements and a second average value of at least two consecutively taken second continuous voltage measurements are determined, and
   the cell capacitor voltage value is determined by choosing one of the first or second average values or by calculating an overall average value of the first and the second average values.

6. The method according to claim 4, where
   a third average value of at least two consecutively taken third continuous voltage measurements and a fourth average value of at least two consecutively taken fourth continuous voltage measurements are determined, and
   the cell capacitor voltage value is determined by choosing one of the sums of either the first and the third or the second and the fourth average values or by calculating an overall average value of the sums of the first and the third and of the second and the fourth average values.

7. The method according to claim 1, where from an evaluation of at least two of the continuous voltage measurements a malfunctioning of one of the four power electronic valves, such as an undesired short- or open-circuiting of or an overvoltage across the power electronic valve, is recognized.

8. The method according to claim 1, where from an evaluation of at least two of the continuous voltage measurements a malfunctioning of the cell is recognized, such as a commutation failure or a failure of a voltage measurement unit of one of the four gate units.

9. The method according to claim 1, where for each of the power electronic valves a discrete level voltage range is determined which defines a voltage range in which the voltage across the corresponding power electronic valve lies and where the continuous voltage measurement for each power electronic valve is compared with its corresponding discrete level voltage range.

10. The method according to claim 9, where in case it is detected that at least one of the continuous voltage measurements lies outside its corresponding discrete level voltage range, that at least one of the continuous voltage measurements is disregarded when determining the cell capacitor voltage value.

11. The method according to claim 10, where in case it is detected that the continuous voltage measurements of the two gate units of one phase leg lie outside their corresponding discrete level voltage ranges, the cell is declared to be a faulty cell.

12. An arrangement to determine a cell capacitor voltage value of a cell of a multi-cell power converter, where the arrangement comprises the cell and a control unit, the cell comprising
- four power electronic valves interconnected as a full-bridge converter having a first and a second phase leg, where each phase leg comprises a series-connection of two of the four power electronic valves and where the connection point between the two power electronic valves of each phase leg is externally connectable,
- a cell capacitor being connected in parallel to the first and the second phase legs, and
- four gate units, each being connected to a corresponding one of the power electronic valves as well as to the control unit, characterized in that
- each of the four gate units comprises a voltage measurement unit adapted to take a continuous voltage measurement across the corresponding power electronic valve,
- each of the four gate units is adapted to transmit its continuous voltage measurement, and
- the control unit is adapted to receive from each of the four gate units its continuous voltage measurement and to determine the cell capacitor voltage value based on at least one of these voltage measurements.

13. The arrangement according to claim 12, where each of the four gate units is adapted to generate and transmit its continuous voltage measurement on a request received from the control unit.

14. The arrangement according to claim 12, where the control unit is adapted to receive the continuous voltage measurements from the gate units at regular time intervals.

15. The arrangement according to claim 12, where the gate units are connected to the control unit via an electrically isolated communication link, in particular at least one optical fibre line.

16. The arrangement according to claim 12, where the control unit and each of the four gate units are adapted to interactively perform a method to determine a cell capacitor voltage value of a cell of a multi-cell power converter,
characterized in that
- across each of the power electronic valves a continuous voltage measurement is taken by the corresponding gate unit, and
- the cell capacitor voltage value is determined based on at least one of the continuous voltage measurements,
- where the continuous voltage measurements are taken only while none of the power electronic valves belonging to the same phase leg is in a switching process.

* * * * *